United States Patent [19]

Huang

[11] Patent Number: 5,535,779
[45] Date of Patent: Jul. 16, 1996

[54] WATER OUTLET CONTROL DEVICE

[76] Inventor: Lung-Shen Huang, 18, Alley 47, Lane 416, Chung Shan Rd., Sec. 2, Panchiao, Taipei, Taiwan

[21] Appl. No.: 268,960

[22] Filed: Jun. 30, 1994

[51] Int. Cl.⁶ .................................................. F16K 37/00
[52] U.S. Cl. .......................... 137/559; 137/551; 137/801; 251/155; 239/72; 239/74; 374/147
[58] Field of Search ........................... 137/551, 559, 137/798, 801; 374/145, 147, 148, 160, 162; 340/584; 251/155; 239/71, 72, 74

[56] References Cited

U.S. PATENT DOCUMENTS

| | | | |
|---|---|---|---|
| 2,245,195 | 6/1941 | Hopkins | 251/155 X |
| 2,987,080 | 6/1961 | Chandler et al. | 137/798 |
| 3,916,948 | 11/1975 | Benjamin | 137/599 X |
| 4,393,365 | 7/1983 | Kondo et al. | 374/145 X |
| 4,773,767 | 9/1988 | Coll | 374/162 X |
| 4,994,792 | 2/1991 | Ziegler, Jr. | 374/147 X |
| 5,171,429 | 12/1992 | Yasuo | 137/551 X |
| 5,265,959 | 11/1993 | Meltzer | 374/162 X |

*Primary Examiner*—John Rivell
*Attorney, Agent, or Firm*—Beveridge, DeGrandi, Weilacher & Young

[57] ABSTRACT

A faucet or shower head includes a transparent zone on the casing thereof through which the color and quality of the water may be visually checked. A temperature display chip is mounted within the transparent zone and is covered with a transparent protective covering. The temperature display chip detects and displays the temperature of the water passing through the faucet or shower head. If the water temperature exceeds a predetermined value, a temperature controlled integrated circuit (IC) is activated to automatically give an audio alarm. This alarm helps prevent users from being scalded with excessively hot water.

8 Claims, 4 Drawing Sheets

WATER OUTLET CONTROL DEVICE

BACKGROUND OF THE INVENTION

The present invention relates to faucets and shower heads, and relates more particularly to such a faucet or shower head which allows the user to observe the quality of water and, which automatically gives an audio alarm when the temperature of the water is excessively high.

Regular faucets and shower heads, made of either metal or plastics, are commonly made opaque. Therefore, one cad, not know if there is mud or iron rust accumulated in a faucet or shower head. It may be too late to avoid taking in dirty water by the time that one discovers dirty matter in the water. Another drawback of conventional faucets and shower heads is that they have no means to indicate the temperature of the water. When an excessively lot flow of water is suddenly drawn out of a faucet or shower head, the user may be scalded with the sudden flow of excessively hot water. Furthermore, the spout of a regular faucet is suitable for attaching a hose of only one specific size. Because regular hoses are made in different sizes, one must check the size carefully before buying a hose. A hose which does not match with tile spout of the faucet becomes useless.

SUMMARY OF THE INVENTION

The present invention has been accomplished under the circumstances noted above. It is therefore the principal object of the present invention to provide a water outlet control device which eliminates the aforesaid drawbacks.

According to one aspect of the present invention, the water outlet control device for controlling the output of water from a water supply system has a transparent zone integrally made on the casing thereof, wherein through the transparent zone, the user can visually check the color and quality of the water.

According to another aspect of the present invention, the water outlet control device has a temperature display chip mounted within the transparent zone and covered by a protective covering. This temperature display chip is provided to detect and show the temperature of the water.

According to still another aspect of the present invention, the water outlet control device further comprises a temperature-controlled voice IC which automatically gives an audio alarm when the water temperature surpasses a predetermined value.

According to still another aspect of the present invention, the casing of the water outlet control device has a spout made with a stepped outer diameter for attaching any of a variety of hoses having different diameters.

BRIEF DESCRIPTION OF THE DRAWINGS

The present invention will now be described by way of example with reference to the annexed drawings, in which.

DETAILED DESCRIPTION OF THE PREFERRED EMBODIMENTS

Figure 1:
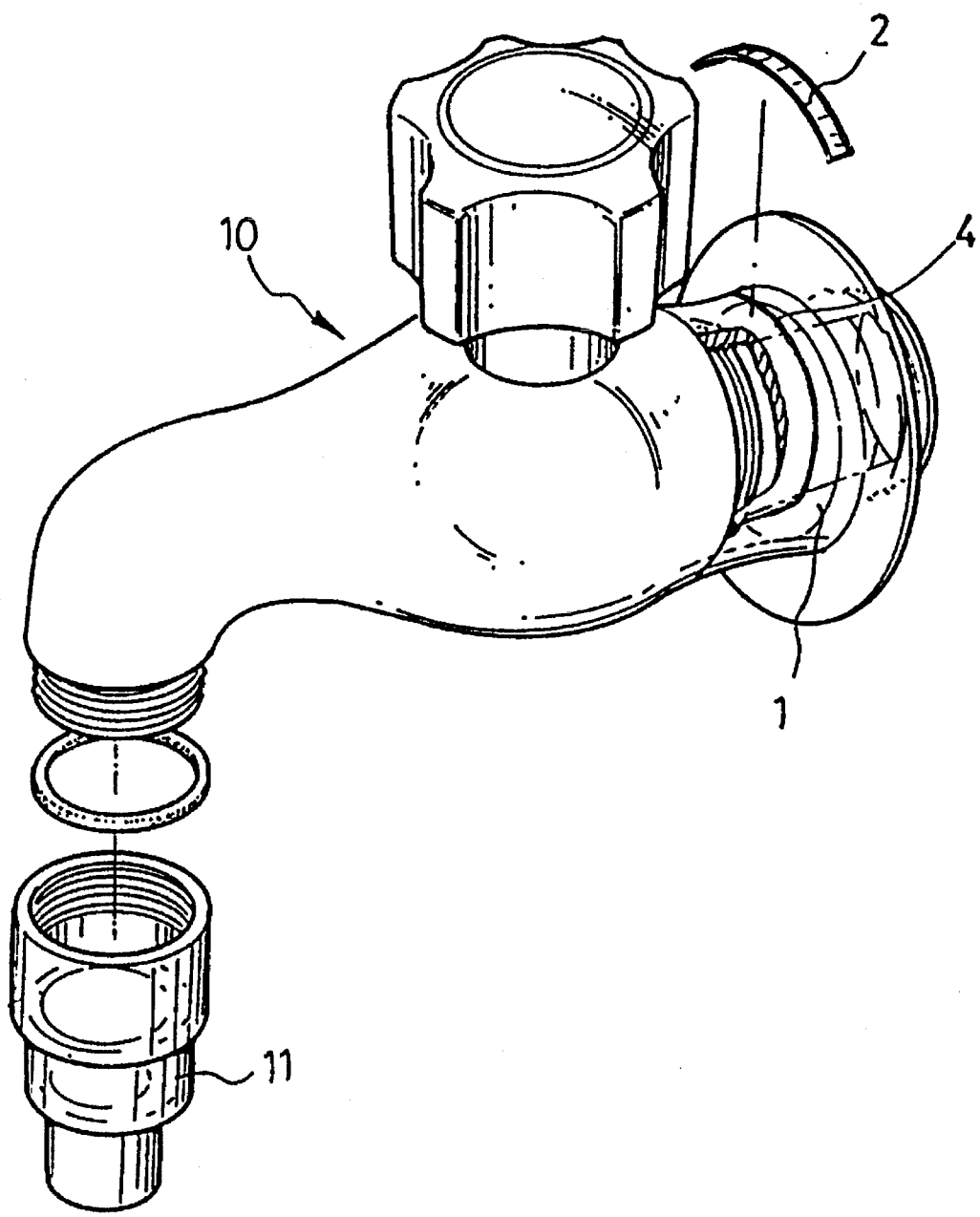
FIG. 1 is an exploded view of a faucet constructed according to the present invention.
Figure 2:
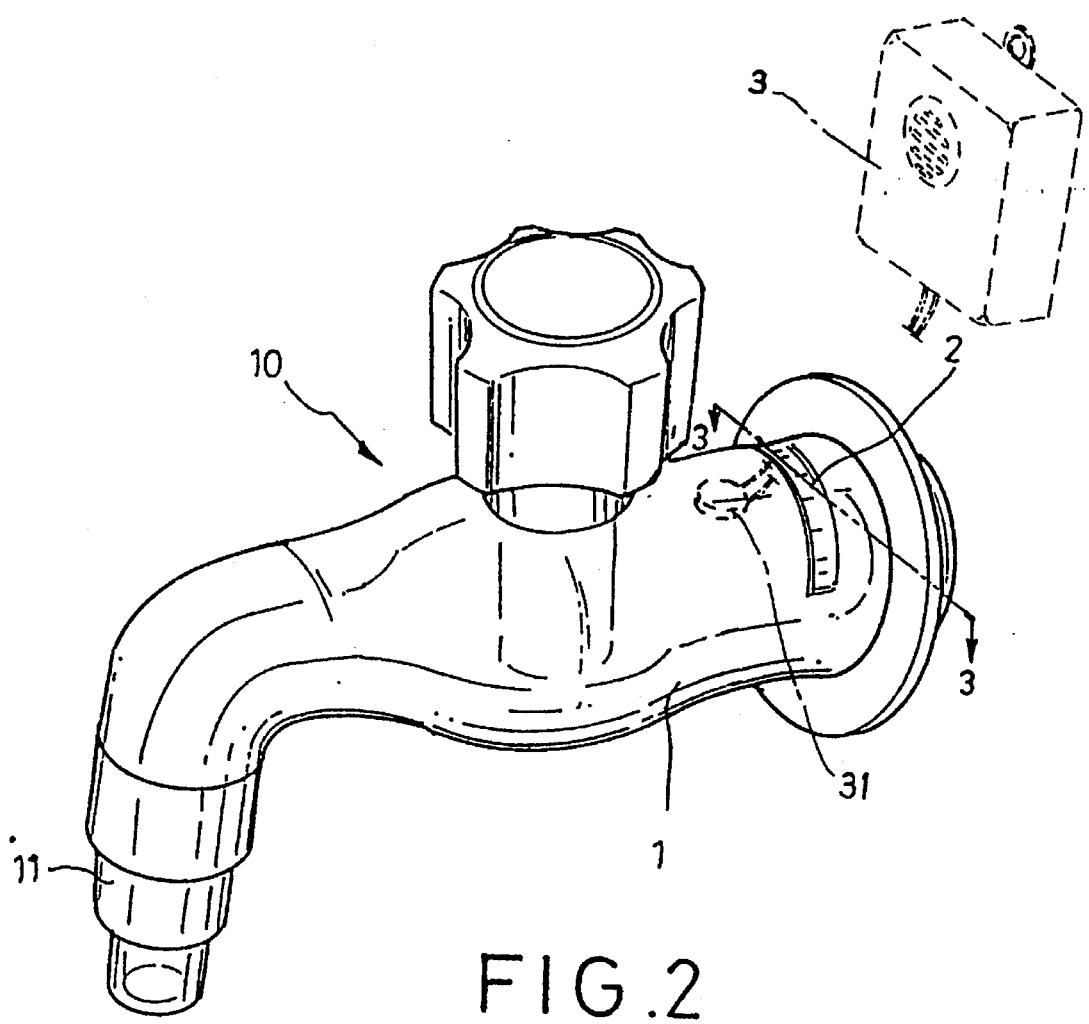
FIG. 2 is a perspective view of the faucet shown in FIG. 1.
Figure 3:
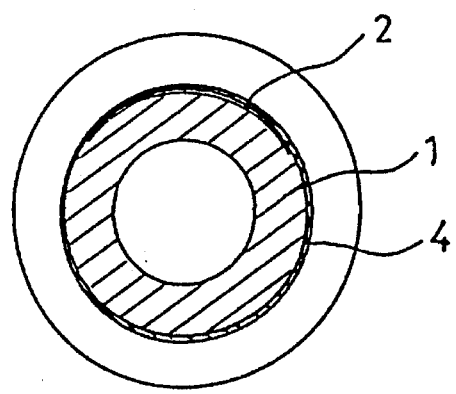
FIG. 3 is a sectional view taken along line 3—3 of FIG. 2.
Figure 5:
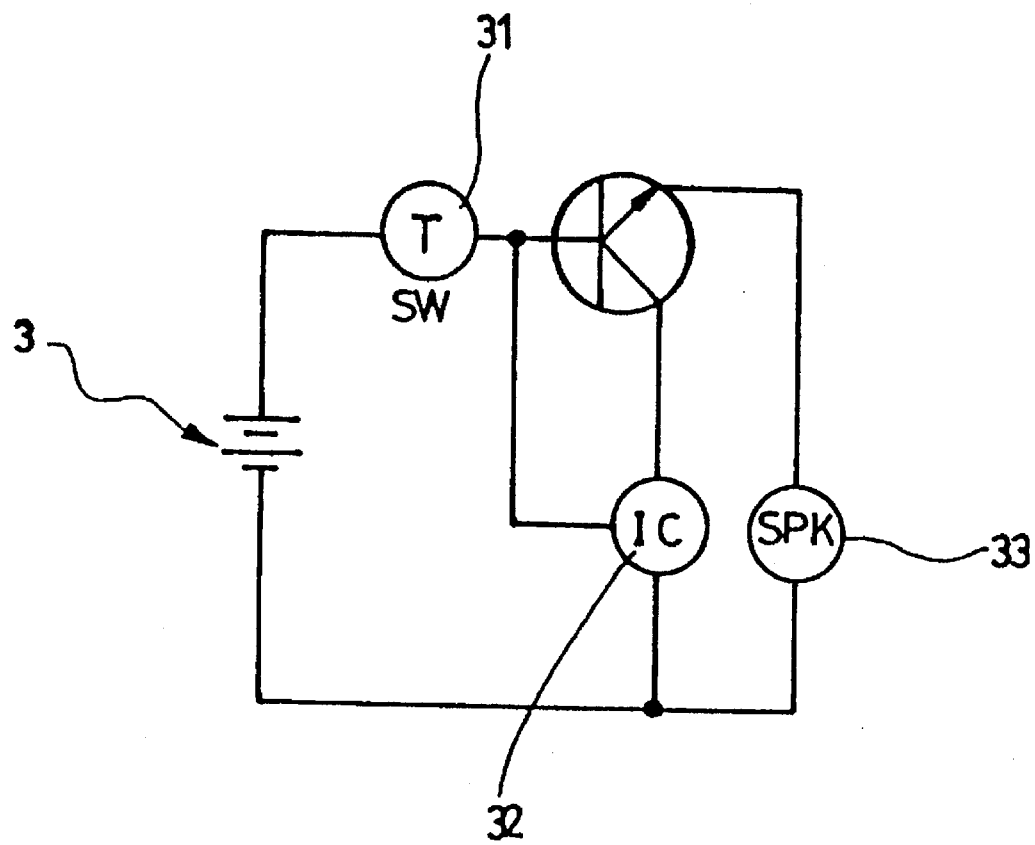
FIG. 5 is a circuit diagram of a voice IC (integrated circuit) according to the present invention.

FIGS. 1, 2, and 3 illustrate a faucet 10 constructed according to the present invention. The faucet 10 is wholly or partially molded from polycarbonate, having a transparent zone 1. A temperature display chip 2 is mounted within the transparent zone 1 to detect and show the temperature of water passing through. A transparent film 4 is covered over the temperature display chip 2 for protection. A temperature-controlled voice IC 3 may also be mounted within the transparent zone 1 and covered by the transparent film 4 to automatically give an audio alarm when the temperature of the water surpasses a predetermined value. The temperature-controlled voice IC 3, as shown in FIG. 5, comprises a thermo-control switch 31 attached to the surface of the faucet 10 to detect the temperature of the water passing through, a speaker 33, and a voice IC 32 controlled by the thermo-control switch 31 to produce an audio warning signal through the speaker 33.

When the aforesaid faucet 10 is installed in the water outlet of a water supply system, one can observe the color and quality of the water through the transparent zone 1. If there is accumulated mud or iron rust, or if the color of the water is abnormal, one can then take the necessary steps to solve the problem without taking in dirty water. By means of color change, the temperature display chip 2 shows the temperature of the water in the faucet 10. If the temperature of the water in the faucet 10 surpasses a predetermined value, the temperature-controlled voice IC 3 automatically gives a warning sound to prevent the user from being burned with excessively hot water.

Referring to FIGS. 1 and 2 again, the spout 11 of the faucet 10 has a stepped outer diameter suitable for alternatively attaching commercially available hoses of different sizes.

Figure 4:
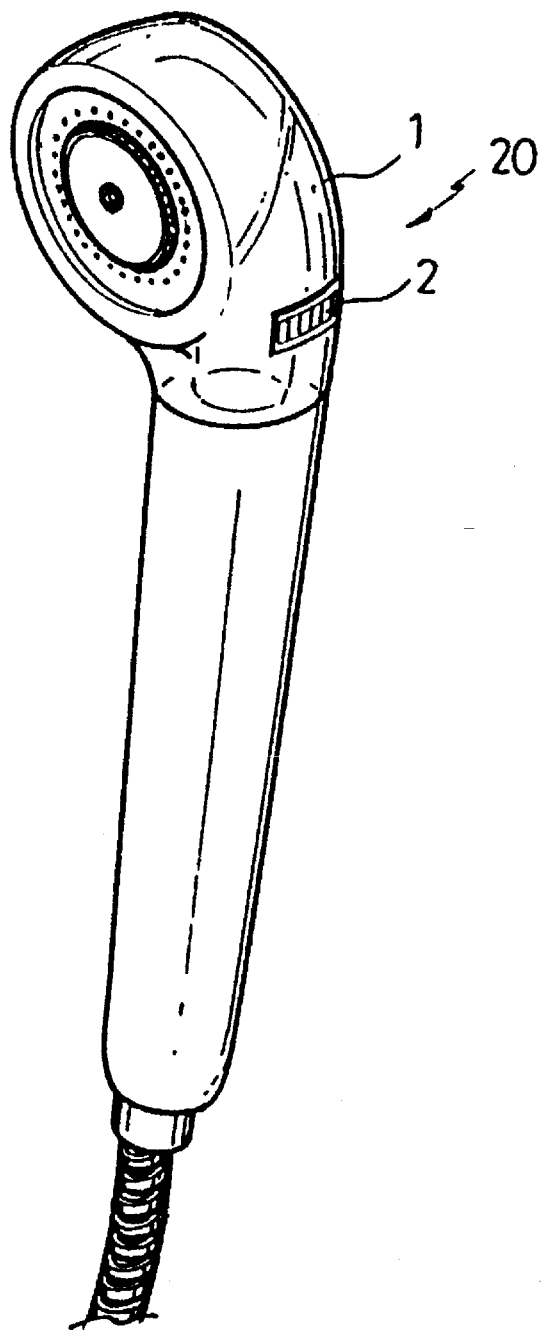
FIG. 4 shows a shower head constructed according to the present invention.

Referring to FIG. 4, therein illustrated is a shower head 20 constructed according to the present invention. As illustrated, the shower head 20 has a transparent zone 1 for visually checking the quality of the water, and a temperature display chip 2 for showing the temperature of water. This shower head 20 also may include a temperature-controlled voice IC for giving an audio alarm when the temperature of water surpasses a predetermined value, as described above with respect to FIGS. 1, 2 and 5.

While only two embodiments of the present invention have been shown and described, it will be understood that various modifications and changes could be made without departing from the spirit and scope of the invention.

What is claimed is:

1. A water faucet, comprising: a casing for fastening to an outlet of a water supply pipe for controlling water output, a transparent zone in said casing, wherein water in said casing is visible through the transparent zone, a temperature display chip mounted within said transparent zone, and a transparent protective covering over the temperature display chip, wherein the temperature display chip is provided to detect and display the temperature of water in or passing through said casing.

2. The water faucet of claim 1, further including: a temperature-controlled integrated circuit mounted within said transparent zone and covered by said transparent protective covering to automatically give an audio alarm when the temperature of water in or passing through said casing surpasses a predetermined value.

3. The water faucet of claim 1, wherein said casing includes a spout having a stepped outer diameter for attaching hoses of different sizes.

4. The water faucet of claim 1, further including a thermo-control switch attached to a surface of the water faucet.

5. The water faucet of claim 4, further including an integrated circuit and a speaker which are controlled by thermo-control switch to produce an audio signal when the temperature of the water surpasses a predetermined level.

6. A water faucet, comprising:

a casing for fastening to an outlet of a water supply pipe for controlling water output, wherein the casing includes a spout having a stepped outer diameter for attaching hoses of different sizes;

a transparent zone in said casing, wherein water in the casing is visible through the transparent zone;

a temperature display chip mounted within said transparent zone, wherein the temperature display chip is provided to detect and display the temperature of water in or passing through the casing;

a transparent protective covering over the temperature display chip; and a temperature-controlled integrated circuit mounted within the transparent zone and covered by the transparent protective covering to automatically give an audio alarm when the temperature of water in or passing through the casing surpasses a predetermined value.

7. A shower head, comprising:

a casing for connecting to an outlet of a water supply pipe for controlling water output;

a transparent zone in the casing, wherein water in the casing is visible through the transparent zone;

a temperature display chip mounted within the transparent zone, wherein the temperature display chip is provided to detect and display the temperature of water in or passing through the casing; and a transparent protective covering over the temperature display chip.

8. The shower head of claim 7, further including:

a temperature-controlled IC mounted within the transparent zone and covered by the transparent protective covering to give an audio alarm when the temperature of water in or passing through the casing surpasses a predetermined value.

* * * * *